A. J. HORTON.
MOTOR CONTROLLER.
APPLICATION FILED JAN. 9, 1915.

1,237,518.

Patented Aug. 21, 1917.

Witnesses
J. L. Johnson
J. H. Hutchinson Jr.

Inventor
Albert J. Horton
By Frank H. Hubbard
Attorney

UNITED STATES PATENT OFFICE.

ALBERT J. HORTON, OF WHITE PLAINS, NEW YORK, ASSIGNOR TO THE CUTLER-HAMMER MFG. CO., OF MILWAUKEE, WISCONSIN, A CORPORATION OF WISCONSIN.

MOTOR-CONTROLLER.

1,237,518.

Specification of Letters Patent.

Patented Aug. 21, 1917.

Application filed January 9, 1915. Serial No. 1,342.

*To all whom it may concern:*

Be it known that I, ALBERT J. HORTON, a citizen of the United States, residing at White Plains, in the county of Westchester and State of New York, have invented new and useful Improvements in Motor-Controllers, of which the following is a full, clear, concise, and exact description, reference being had to the accompanying drawing, forming a part of this specification.

This invention relates to improvements in motor controllers.

One of the objects of the invention is to provide a controller for a motor employed for dynamic breaking purposes which will automatically reduce the flow of current to the shunt field winding thereof when the motor is idle but which will maintain the desired shunt field strength for dynamic braking.

Another object is to provide a controller wherein the switches controlling the continuity of the armature circuit and the dynamic braking circuit, and also the field controlling switch, may be controlled by a common magnet.

A further object is to provide a field current economizing switch governed by the main controlling switch to insure a strong field for starting, and governed independently of said main switch to maintain a strong field for dynamic braking.

Various other objects and advantages of the invention will hereinafter appear.

The accompanying drawing illustrates one embodiment of the invention and the same will now be described.

In the drawing,

Fig. 3 is a diagrammatic view of a control system embodying the controller shown in Figs. 1 and 2.

Figure 1:
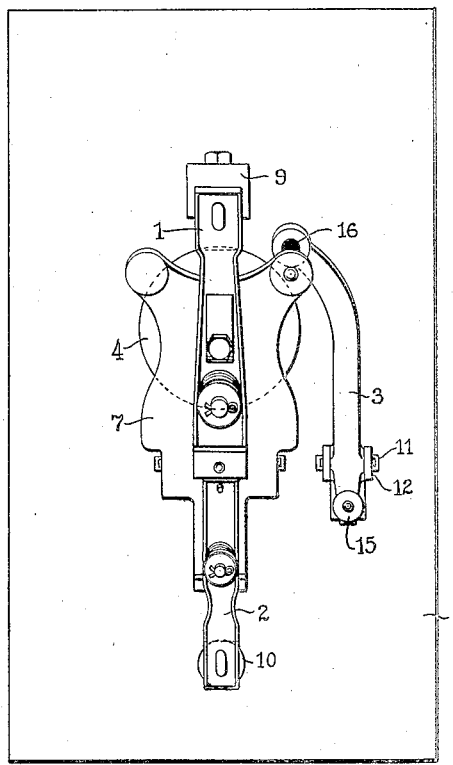
Figure 1 is a front elevation of the controller embodying a main line switch, a dynamic braking switch and a field current economizing switch.
Figure 2:
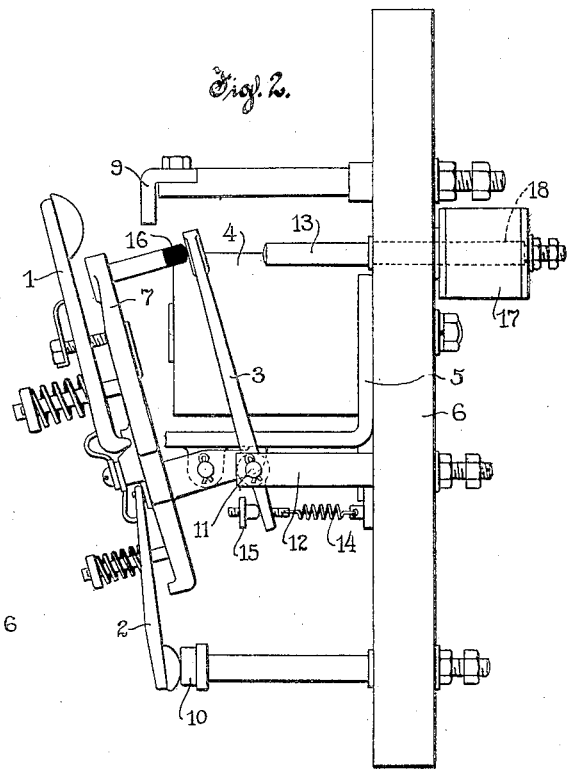
Fig. 2 is a side elevation of the controller shown in Fig. 1.
Figure 2:
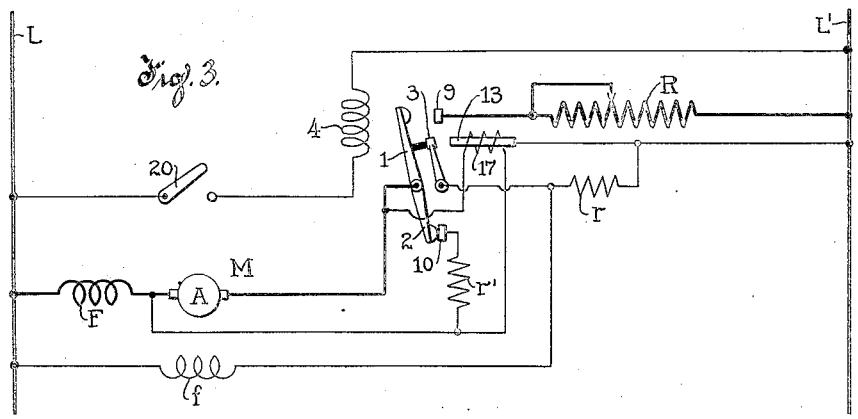

Referring first to the structure illustrated in Figs. 1 and 2 the same includes a switch arm 1 to control the continuity of the motor circuit, a switch arm 2 to control the continuity of the dynamic braking circuit and a switch arm 3 to control the field current. These switch arms are associated with an electromagnet 4 in such a manner that energization of said magnet effects completion of circuit by the arms 1 and 3 for operation of the motor, whereas deënergization of said magnet effects release of the arms 1 and 2 to respectively interrupt the power connections and to complete a dynamic braking circuit. Deënergization of the magnet 4 also tends to effect release of the arm 3 but, through the medium of means hereinafter described, this arm is restrained for dynamic braking purposes until the motor is brought substantially to rest.

More specifically describing the structure shown, the magnet 4 is mounted in a suitable magnetic frame 5 fixed to a supporting base or panel 6 and having a pivoted armature plate 7. The arms 1 and 2 are mounted in a conventional manner upon the armature 7 and are arranged to respectively engage contacts 9 and 10 projecting from the base 6. In normal position of the armature, the contact arm 2 engages contact 10 to complete the dynamic braking circuit while contact arm 1 stands in a spaced relation with its contact 9. When the armature is attracted, however, arm 2 is disengaged from contact 10 to interrupt the braking circuit and arm 1 is moved into engagement with contact 9 to complete the motor circuit.

The contact arm 3 is fulcrumed on a pin 11 carried by a bracket 12 projecting from the base 6 and is arranged to coöperate with a contact 13 also projecting from the base 6. Said lever 3 is normally biased out of engagement with the contact 13 by a tension spring 14 preferably provided with adjusting means 15 for a purpose hereinafter set forth. Engagement between the arm 3 and contact 13 is effected by the armature 7 through the medium of an insulating lug 16 which engages said arm and moves the same inwardly when said armature is attracted. The armature also serves to retain the arm 3 in engagement with contact 13 as long as the magnet 4 is energized to retain switch arm 1 in closed position. The arm 3 has other and additional retaining means, however, namely, an electromagnet 17 responsive to the C. E. M. F. of the controlled motor, as hereinafter set forth. For convenience, the contact 13 engaged by the arm 3 may be formed of magnetic material and employed as a pole piece for the magnet 17 which, as illustrated, is secured to an extension 18 of said contact at the rear of the support 6. The magnet 17 being responsive to the C. E. M. F. of the motor, it will be apparent that if the motor continues to revolve after interruption of its armature circuit, said magnet will restrain the arm 3 until its attractive force is overcome by the spring 14. Thus, by adjustment of the tension of spring 14, the time of release of the lever 3 may be nicely regulated as desired.

Referring now to Fig. 3, the same shows a very simple circuit arrangement which serves to illustrate the usefulness of the controller described. The controller is shown as associated with a motor M having an armature A, a series field winding F, and a shunt field winding $f$. The switch arm 1 serves to connect the motor armature and series field winding across lines L and L' through a resistance R, which may in practice be controlled in any preferred way for accelerating the motor. The switch arm 3 controls a short-circuit around a resistance $r$ in series with the shunt field winding $f$ and completes said short-circuit when the aforesaid motor circuit is closed. The switch arm 2 completes a closed loop across the terminals of the motor armature A, said loop including a suitable resistance $r'$. The winding of magnet 4 is connected across lines L and L' through a suitable control switch 20 and the winding of the retaining magnet 17 for arm 3 is connected in a permanent shunt around the motor armature A.

It will thus be seen that when switch 20 is closed magnet 4 will be energized to complete the motor circuit and simultaneously short-circuit the field resistance $r$. This will start the motor with a strong field, and the C. E. M. F. developed by the motor will cause energization of the winding 17. In consequence, when the magnet 4 is deënergized the arm 1 will move outwardly to interrupt the motor circuit and the arm 2 inwardly to complete a dynamic braking circuit, whereas the arm 3 will be restrained by the magnet 17 unless the motor at once comes to rest, in which event the field resistance $r$ will be immediately included in circuit and the field current thus economized. If the motor continues to operate under the influence of its load, as is common, then the shunt field $f$ remains at full strength so that establishment of the braking circuit as described tends to bring the motor quickly to rest and to effect release of the switch arm 3 only after the braking current is reduced to the value at which the spring 14 is set to predominate the winding 17, that is when the motor armature comes practically to a stop.

What I claim as new and desire to secure by Letters Patent is:—

1. In a motor controller, means for controlling the continuity of the motor circuit, field controlling means tending to weaken the field and operable by said former means in closing the motor circuit to strengthen the field and automatic means for temporarily maintaining said field controlling means in operated position upon opening of the motor circuit by said first mentioned means.

2. In a motor controller, means for controlling the continuity of the motor circuit, field controlling means tending to effect field weakening and operable by said former means in closing the motor circuit to effect field strengthening and electro-responsive means for maintaining the field controlling means in operated position upon opening of the motor circuit by said first mentioned means.

3. In a motor controller, means for controlling the continuity of the motor circuit, field controlling means mechanically operable thereby in closing the motor circuit but independent thereof in opening said circuit, and electro-responsive means for temporarily maintaining said field controlling means in operated position upon opening of the motor circuit by said first mentioned means.

4. In a motor controller, means for controlling the continuity of the motor circuit, field regulating means, a common electro-responsive device for operating said two first mentioned means, and electro-responsive means independent of said device for maintaining said field regulating means in operated position after opening of the motor circuit by said first mentioned means.

5. In a motor controller, means for controlling the continuity of the motor circuit and for establishing a dynamic braking circuit when the motor circuit is opened, field controlling means operable by said first mentioned means in closing the motor circuit and electro-responsive means for maintaining said field controlling means in operated position upon establishment of the dynamic braking circuit by said first mentioned means.

6. In a motor controller, means for controlling the continuity of the motor circuit and for establishing a dynamic braking circuit when the motor circuit is opened, field controlling means, a common electro-responsive device for operating both of said means, and electro-responsive means independent of said device for temporarily maintaining said field controlling means in operated position upon the establishment of the dynamic braking circuit by said first mentioned means.

7. In a motor controller, means for controlling the continuity of the motor circuit and for establishing a dynamic braking circuit when the motor circuit is opened, field controlling means operable by said first mentioned means in closing the motor circuit but independent thereof in opening said circuit, and electro-responsive means in shunt with the motor armature for maintaining said field controlling means in operated position during dynamic braking after the motor circuit is opened.

8. In a motor controller, means for controlling the continuity of the motor circuit and for establishing a closed loop across the armature when the motor circuit is opened, field controlling means operable by said first mentioned means in closing the motor circuit but independent thereof in opening the motor circuit, and electro-responsive means permanently in shunt with the motor armature for maintaining said field controlling means in operated position during dynamic braking and releasing the same when the motor is stopped.

9. In a motor controller, in combination, a pivoted contact member for controlling the continuity of the motor circuit, an electro-responsive winding for operating the same, a second pivoted contact member controlling the field of the motor and operable by said first mentioned contact member upon operation thereof by said winding and a second electro-responsive winding for restraining said last mentioned contact member in operated position independently of said first mentioned contact member.

10. In a motor controller, in combination, a pivoted contact member for controlling the continuity of the motor circuit, an electro-responsive winding for operating the same, a second pivoted contact member controlling the field of the motor and operable by said first mentioned contact member upon operation thereof by said winding, a second electro-responsive winding for restraining said last mentioned contact member in operated position independently of said first mentioned contact member and adjustable means biasing said second mentioned contact member against the restraining action of said second electro-responsive winding.

11. In a circuit controller, in combination, a support, an electromagnet mounted thereon, independent stationary contacts on opposite sides of said magnet, a pivoted switch member forming an armature for said magnet and having contacts to selectively engage said stationary contacts in different positions of said member, a second switch member mounted on said support adjacent said first mentioned member and operable by the same when attracted, and a second electromagnet on said base for restraining said second mentioned switch member independently of said first mentioned magnet and of said first mentioned member.

12. In a circuit controller, in combination, a support, a switch arm pivoted thereon, a second switch arm pivoted thereon and operable by said first mentioned arm in one direction, a magnetic stationary contact for said second mentioned arm, an electromagnet on said support and having a magnetic circuit through said magnetic contact and a separate electromagnet on said support for actuating said first mentioned arm.

13. In a circuit controller, in combination, a supporting base, a pivoted switch member thereon, an electromagnet on said base for actuating said member, a second switch member pivoted adjacent said first member, an insulating lug on said first member to engage and move said second member upon actuation of the former, a magnetic stationary contact for said second mentioned member mounted on said base and an electromagnet mounted on said magnetic contact to restrain said second member independently of said first member and magnet.

In witness whereof, I have hereunto subscribed my name in the presence of two witnesses.

ALBERT J. HORTON.

Witnesses:
W. L. CULLY,
B. L. SPEARSY.